(12) United States Patent
Metzinger et al.

(10) Patent No.: US 6,542,843 B1
(45) Date of Patent: Apr. 1, 2003

(54) METHOD FOR PRODUCING MATCHED FLUID CONTACT SURFACES

(75) Inventors: Peter Metzinger, München (DE); Rupert Stelzer, Fürstenfeldbruck (DE); Reimund Haimerl, Mainburg (DE); Georg Muschal, Erding (DE); Arndt Glaesser, Dachau (DE)

(73) Assignee: MTU Motoren-und Turbinen-Union München GmbH, Munich (DE)

( * ) Notice: Subject to any disclaimer, the term of this patent is extended or adjusted under 35 U.S.C. 154(b) by 0 days.

(21) Appl. No.: 09/562,239

(22) Filed: Apr. 28, 2000

(30) Foreign Application Priority Data

May 12, 1999 (DE) .......................... 199 22 012

(51) Int. Cl.⁷ ............................................ G06F 19/00
(52) U.S. Cl. ...................................................... 702/113
(58) Field of Search ................... 29/889, 402; 219/121, 219/76.15; 228/119, 112; 702/113

(56) References Cited

U.S. PATENT DOCUMENTS

| | | | |
|---|---|---|---|
| 4,883,216 A | * 11/1989 | Patsfall | 228/119 |
| 4,897,519 A | * 1/1990 | Clark et al. | 219/76.14 |
| 4,958,431 A | * 9/1990 | Clark et al. | 29/889.1 |
| 4,998,005 A | 3/1991 | Rathi et al. | |
| 5,062,205 A | * 11/1991 | Fraser | 29/889.7 |
| 5,185,924 A | * 2/1993 | Fraser | 29/889.1 |
| 5,285,572 A | 2/1994 | Rathi et al. | |
| 5,688,552 A | * 11/1997 | Lacomis et al. | 427/140 |
| 5,755,030 A | * 5/1998 | Fraser | 29/889.1 |
| 5,794,338 A | * 8/1998 | Bowden et al. | 29/402.09 |
| 5,913,555 A | * 6/1999 | Richter | 29/889 |
| 5,914,055 A | * 6/1999 | Roberts et al. | 219/76.15 |
| 6,095,402 A | * 8/2000 | Brownell | 228/112.1 |
| 6,326,585 B1 | * 12/2001 | Aleshin et al. | 219/121.63 |
| 6,332,272 B1 | * 12/2001 | Sinnott et al. | 29/889.72 |

FOREIGN PATENT DOCUMENTS

| | | |
|---|---|---|
| DE | 40 14 808 | 11/1990 |
| DE | 196 42 980 | 8/1998 |
| EP | 0 389 913 | 10/1990 |
| EP | 0 837 220 | 4/1998 |

\* cited by examiner

*Primary Examiner*—John Barlow
*Assistant Examiner*—Tung Lau
(74) *Attorney, Agent, or Firm*—Schiff Hardin & Waite

(57) ABSTRACT

A method for producing matched surfaces on rotor units with integral blades comprising a hub and at least one blade ring, by removing by machine after integral joining with component overmeasure in the area of the joining zone, whereby at least one actual surface is acquired by measuring method, and a surface matching it, is produced. Acquisition by measuring method and production take place on a process machine in one clamping of the rotor unit. The desired surface of each processing area is provided in the form of stored data. Starting from at least one measured actual surface, a matched surface is produced beyond the joining zone, with the surface everywhere adjoining the actual surface and/or a so-called repair surface of which there is at least one, without any kinks or steps at a specifiable minimum curvature. As far as is possible, the surface itself corresponds to a mathematically continuous spatial surface comprising a locally and/or direction-dependent variably-specifiable minimum curvature, whereby approximation to the desired profile takes precedence over approximation to the desired position.

16 Claims, 2 Drawing Sheets

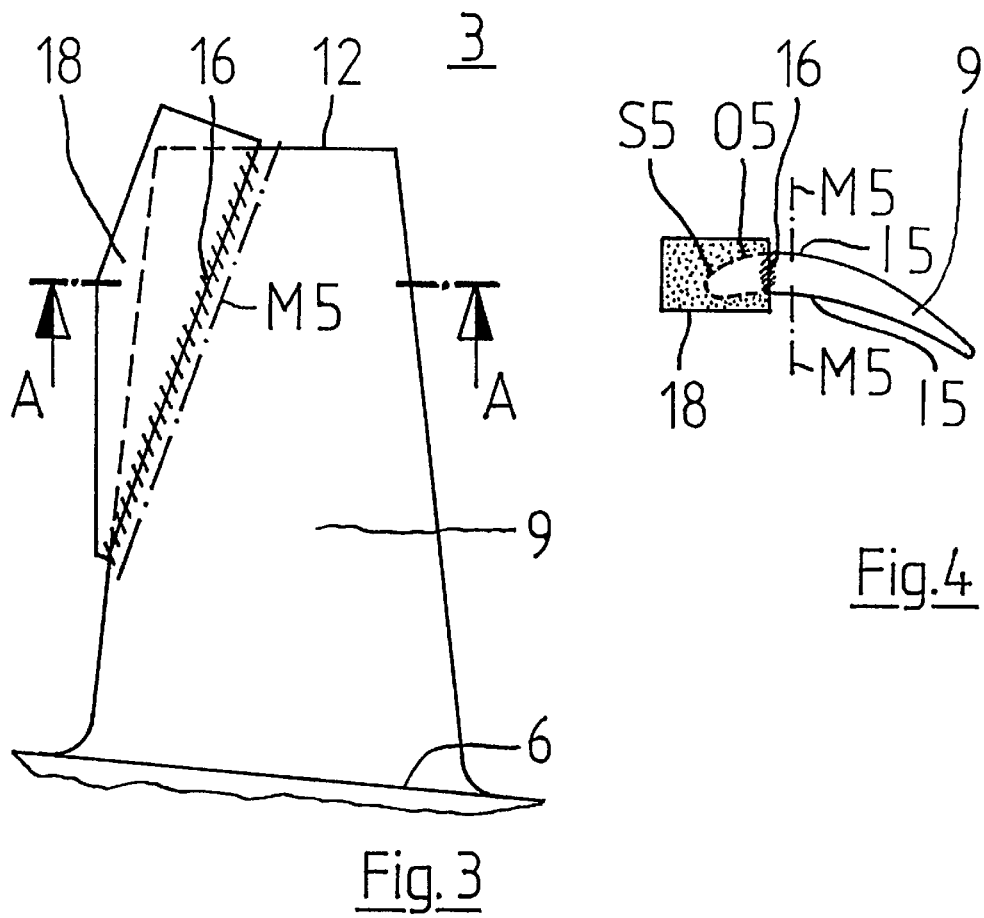
Fig.3
Fig.4
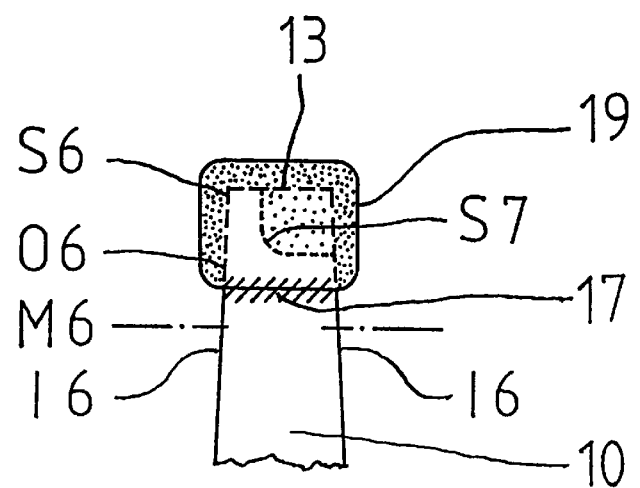
Fig.5

METHOD FOR PRODUCING MATCHED FLUID CONTACT SURFACES

FIELD OF THE INVENTION

The present invention relates to a method for producing matched fluid contact surfaces on rotor units with integral blades.

BACKGROUND OF THE INVENTION

As a rule, rotor units with integral blades whose blades are integrally connected to the hub, free from backlash, by means of welding, forging, soldering or bonding, provide advantages concerning strength, weight and design volume. They are therefore increasingly incorporated in advanced turbomachinery constructions. In this context, the primary object is the replacement of the generally used positive-fit rotating blade attachment (e.g. with pine tree or dovetail profiles) in rotors with essentially axial through flow. Both blade attachment/installation and blade repair/exchange, are admittedly more expensive and difficult in rotors with integral blades than in positive fit constructions. Modified or novel production and repair methods are required of which linear friction welding is a particularly striking and important example. In spite of its name, this joining process by friction welding is metallurgically closer to forging than to welding. Induction welding is another currently used joining process in which after electroinductive heating by joining pressure, a fine-grain "forging microstructure" is generated too.

Soldering and bonding processes are in principle also possible, but most of the time, the joining zone thermally/mechanically forms a "weak point".

Without exception, currently used joining methods require overmeasure in the area of the joining zone, in at least one of the components to be joined. This requirement may result from the type of component clamping and introduction of force (such as in linear friction welding) or it may result from the criterion that the joining zone should be able to be reworked on all sides, in particular so as to compensate for geometric joining errors. During the joining process itself, as a rule, there is an issue of material (e.g. flash during friction welding) which subsequently also needs to be removed. In any case at least the area of the joining zone is reworked and optimized by removing material from its surface shape, with aspects of fluidic behavior and strength having to be taken into account. The surfaces to be constructed must in addition be matched to existing actual surfaces, with the latter having to be acquired by measuring methods. With modern, efficient production, the measured values are electronically stored, the three dimensions of the surfaces to be produced are calculated, and shaped by means of removal by machine, with all three steps of "measuring", "calculating" and "producing" being based on linked data processing.

From the European published application EP 0 837 220 A2 a method for repair of worn blade tips of compressor blades and turbine blades is known in which the worn blade tip is cut off at a defined radial height h and replaced by a repair profile whose contour is exactly matched; with attachment of said repair profile occurring by soldering or welding. After separating the worn region, the actual geometry of the remaining rotor blade is measured in the area of the separation plane and thus the plane which will later become the joining plane, and according to these measurement data an exactly matching repair profile is produced, preferably by laser beam cutting with three-dimensional cut guidance. In this process, the surface of the remaining rotor blade from the separation/joining plane with the repair profile, is continued in radial direction to the blade tip so as to be tangentially straight on all sides. Any rework is only required at the soldering joint or at the weld seam, if at all. Apart from the advantage of minimal rework, this method also provides the advantage that, after local repair, the blade can be reused rather than having to be replaced. This method which represents a special form of patching is also suitable for rotor units with integral blades, but only for repairs in the area of the blade tips. Due to the nature of the method, only those surfaces can be produced whose surface lines—in horizontal direction—are straight (cutting with straight laser beam), i.e. no curved surfaces according to requirements, for example as required at the transition from the rotor blade to the hub. The repair component's surface finish by means of laser to finished dimensions must take place before the repair component is attached to the remaining rotor blade. Consequently, it is almost impossible to compensate for geometric joining errors at this stage, as there is no removable overmeasure. Working the repair component/patch to finished dimensions is no longer possible after joining because the laser beam, which essentially cuts radially inward from the blade tip, would at least in places penetrate the remaining rotor blade, thus damaging said rotor blade.

The German published application DE 40 14 808 A1 describes a machine vision system for automating a machine processing method. Specifically, the system is to be used for repairing worn turbine blade tips, by laser powder build-up welding. The blade tips are of a special geometry in which the thin blade wall describing the profile projects radially beyond the actual face. If the projecting blade wall touches the turbine housing or a housing coating, it experiences wear which can be repaired by build-up welding. First, the worn face edge of the blade wall is ground down, i.e. made plane and smooth. The profiled ring surface described by the face edge is optoelectronically recorded by a camera and converted into a mathematical ring curve with locally defined thickness (width). The data is used directly for controlling the weld process, with the local material build up (powder flow, laser intensity) being matched to the respective thickness of the remaining wall. In this way there is a de facto continuation of an exterior and an interior actual contour with at least approximately plane face, by means of material build up, which certainly requires some rework.

The article "Kompressor- und Turbinenschaufeln automatisch reparieren" [Repairing compressor blades and turbine blades automatically] on pages 672–674 of the German journal Werkstatt und Betrieb 129 (1996) [Workshop and Factory], describes repair of blade tips and blade edges by build-up welding. The spatial actual contour of the respective blade is scanned in several sections near the weld bead and is stored. The actual contour is mathematically continued into the build-up weld area and produced by means of NC processing. It is possible to take into account special geometries at the blade tips, e.g. curved or kinked surface lines. Such a special geometry is for example scanned on a master blade and stored. There is also a reference to an intelligent equalization between the faulty actual geometries and the master geometries. Nevertheless, the expert is not provided with any concrete pointers as to how such equalization should take place.

In the case of rotor units with integral blades, the geometric area for producing matched surfaces can extend along the entire height of the ring volume, i.e. from the hub to the blade tips. The first application case is the production of new components in the context of which the blades, which preferably are largely in their finished state, are joined to the hub and where at least in the area of the joining zones close to the hub, the blades are formed by metal removing.

During operation of the rotors, wear and damage can occur which require repair. In the worst case, entire blades need to be replaced, but more frequently, more or less sizeable blade parts or areas need to be replaced. Naturally this concerns mostly the inlet edges and outlet edges as well as the tips of the blades. The damaged areas are separated, e.g. by means of laser beam cutting, and replaced by components/patches with oversize. If the damage extends only a little into the blade material, a simple build up of material with overmeasure, e.g. by means of laser powder build-up welding may be sufficient, so that no actual spare parts are required. However in practice, often combinations of the measures "blade replacement", "partial blade replacement/patching" and "material build-up" may be sensible since various types of damage can occur during extended operational phases.

SUMMARY OF THE INVENTION

Based on the aforenoted needs, it is an object of the present invention to provide a method for production of matched fluidic surfaces on rotor units with integral blades which method is equally suitable both for the production of new parts and for repair; which can be applied to the entire blade surface including its transition to the hub up to close proximity to the hub; which, taking into account minimum curvatures, makes possible the production of surfaces free of steps and kinks of any curvature; which makes it possible to use various types of metal removal as well as preceding joining or material build up; and which works particularly precisely, fast and cost-effectively.

According to the present invention, these objects are met by measuring acquisition and production takes place on one processing machine with the same clamping of the rotor unit in one cycle. This increases the precision of the method and reduces its duration.

According to the method of the present invention, the processing machine "knows" the desired surface of each area to be processed and thus "knows" the optimal target shape of the component. According to the method of the present invention, the actual measuring acquisition and the specified desired data are first converted to a computed spatial expanse, and subsequently to a real produced component surface. The method of the present invention defines the transition mode between the surface to be produced and an actual surface or a so-called repair surface which on all sides is determined and produced within an actual surface in the component. The method of the present invention defines the contextual features of the surface to be produced, the mathematical/theoretical specification in practical application being converted in the best possible way, i.e. as well as is possible with justifiable expense.

The method of the present invention takes into account the cases in which the desired surface (desired profiles in desired position) cannot be produced or cannot be entirely produced, and it prioritizes the desired profile in respect to the desired position.

It is clear to the expert versed in the art that due to software factors, real machine production methods may (and in reality frequently do) lead to deviations in respect of the theoretical/mathematical specifications. With reliable and precise production technologies, such deviations can however be minimized and kept within tolerable orders of magnitude from the point of view of fluidic behavior and strength. For example, in the case of surfaces made by machine, minimal steps, grooves or kinks may be tolerable although in these positions theoretically a mathematically continuous, smooth area was specified.

Other objects and advantages of the invention will become apparent upon reading the following detailed description and appended claims, and upon reference to the accompanying drawings.

BRIEF DESCRIPTION OF THE DRAWINGS

Below, the invention is illustrated in more detail by means of simplified drawings, wherein:

FIG. 3 is a lateral view of a patched blade;

FIG. 4 is a longitudinal sectional view taken substantially along the line A—A of FIG. 3; and FIG. 5 is a partial view of a blade illustrating the tip area with material build-up.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE PRESENTLY PREFERRED EMBODIMENTS

Figure 1:
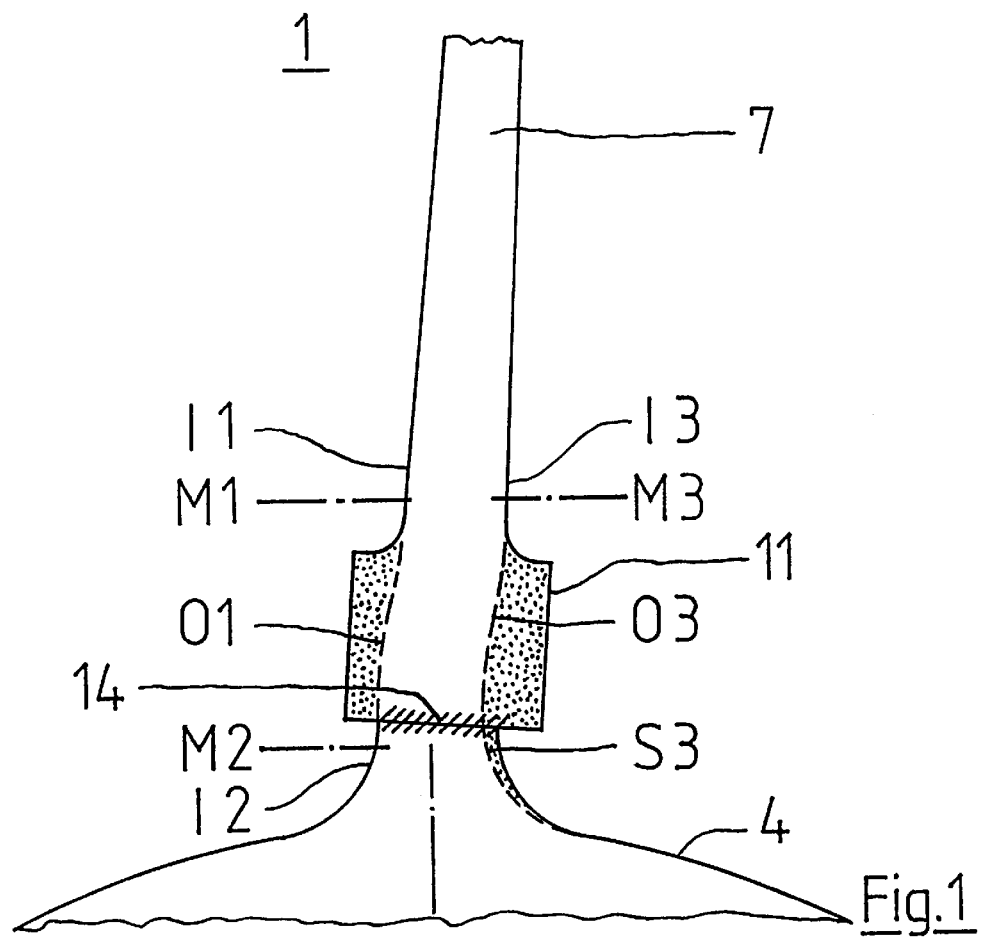
FIG. 1 is a partial cross-sectional view of a rotor unit with one of several blades whose form had largely been finished prior to joining of the blades to the hub.

In FIG. 1, part of the hub 4 and part of the blade 7 of the rotor unit with integral blades are shown. The blade 7 was preferably attached to a hump-like elevation of the hub 4 by linear friction welding. For the purpose of manipulation and introduction of force it comprises a thickened section 11 at the radially inward, lower extremity. The joining zone 14 is indicated by a hatched line. The intentionally exaggerated diagram shows that the blade 7 was attached with a geometric error. For example there is both lateral offset to the right in relation to the hub 4 and an angular error, namely an inclination to the right which deviates from the radial direction.

FIG. 1 shows a situation which may occur either in the context of producing a new component or in the context of repair, with the alphanumeric references on the left side of the blade referring to repair, and the references on the right side referring to the production of a new component.

Prior to joining, the surface of the blade 7 should largely be finished, e.g. by means of precision forging. It thus represents an actual surface I 1 or I 3 respectively, which as a reference surface must no longer be changed or damaged. Just above the thickened section 11 this actual surface is measured with the references M 1 and M 3 with dot-dash lines representing measuring zones which in sections measure the actual surface area in order to determine the profile gradient in longitudinal and transverse directions and to determine the profile change in radial direction. A measuring zone is thus not a line, e.g. around the profile at a radial height, but instead always an area. To this extent, the dot-dash lines only indicate the approximate, average height position of measuring zones M 1 to M 3.

In the case of repair (left side), the actual surface I 2 between the joining zone 14 and the hub 4 is measured in the area of the measuring zone M 2.

Between the actual surfaces I 1, I 2, a matched surface O 1 which connects said actual surfaces I 1, I 2 is produced. This matched surface O 1 merges into the actual surface without any steps or kinks and is in itself stepless and free of kinks, as well as mathematically continuous as far as possible, taking into account local and minimum curvatures and minimum curvatures variably specifiable depending on the direction. If necessary the principle "desired profile takes precedence over desired position" shall apply. The production criteria according to the invention as well as the geometric joining errors lead in radial direction to a gentle S-shape of the surface O 1, with the excessive material which will need to be removed being shown by a dotted area.

The situation is similar when producing new components (right side), but only one zone M 3 above the thickened section 11 is measured. In the new condition, the hump-like elevation on the hub 4 should have overmeasure so that the matched surface O 3, emanating from the upper actual surface I 3, merges downward into the desired surface S 3 which is also just being produced. It cannot be stated categorically at what radial height the matched surface O 3 is to merge into the desired surface S 3. However, the invention tends to create transition zones with deviations from the desired value as short or small as possible, taking into account minimum curvatures.

Figure 2:
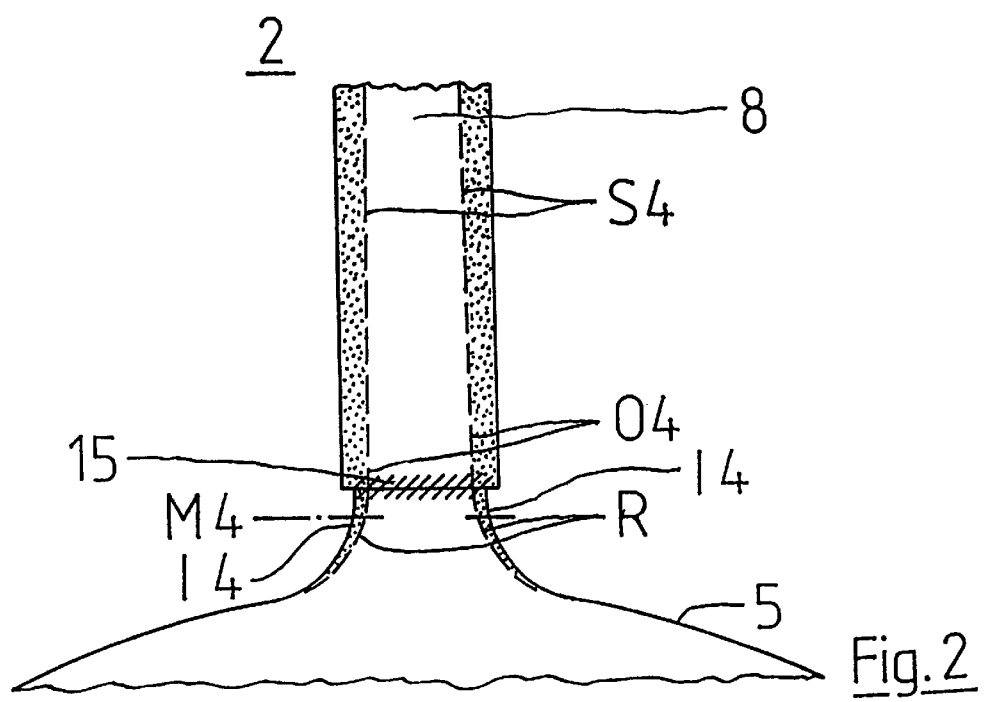
FIG. 2 is a comparable partial cross sectional view with an overmeasure exchange component from which the blade is shaped.

FIG. 2 shows a repair case of a rotor unit 2 in which practically a complete blade was replaced by an overmeasure part. Here the actual contour I 4 between the joining zone 15 and the hub 5 is acquired by measuring method in a measuring zone M 4 around the "hump profile". On all sides, at a distance to the measured actual surface I 4, a so-called repair surface R is defined in the component. Production of the matched surface O 4 is based on said repair surface R, whereby at the lowest possible radial height a transition to the desired surface S 4 is created, with said desired surface S 4 being continued upward, up to the blade tip (not shown). The repair surface R is also produced during this cycle, with production either before or after production of the surface O 4. Thus three "types" of surfaces are produced (O 4, R, S 4) with O 4 representing the matched surface. All surfaces together form the shape of the actual blade 8, with a relatively large volume of excess material having to be worked off in this case. There is however the advantage that the blade 8 very largely conforms to the desired dimensions, i.e. it is very precise.

FIGS. 3 and 4 relate to the so-called patching, i.e. partial replacement of the blades, with exchange components which generally comprise overmeasure on all sides. FIG. 3 shows a lateral view of a blade 9, in this instance a turbine blade, of a rotor unit 3, viewed in circumferential direction, with part of the hub 6 being shown. The inlet edge of the blade 9 was separated along most of its radial height right up to the blade tip 12 by a plane cut inclined towards the top right. It was replaced by a welded-on patch 18 approximating the shape of the blade and incorporating overmeasure on all sides. It can for example be cut from a rectangular bar or thick sheet. The joining zone 16 is shown by a hatched line. FIG. 4 shows an axial/tangential section according to section A—A in FIG. 3 which shows the blade profile. The shape of the part of the blade 9 situated on the right of the joining zone is given and will not be changed. Its actual surface I 5 is acquired on both sides of the profile in the measuring zone M 5 near the joining zone 16, so as to be able to match the profile area to be produced, from the joining zone 16 to the left. The matched surface O 5 should merge in the shortest possible way into the desired surface S 5, i.e. the desired profile should merge into the desired position, which is not always possible. At least the matched surface should approximate the desired surface as far as is possible, with matching to the desired profile, i.e. the desired shape being more important than matching to the desired position ("desired profile takes precedence over desired position"). In principle, patching of the type shown in FIGS. 3 and 4 is possible at any position of a blade. The patch can also be located in the middle of the blade, e.g. as a disk in a respective hole in the blade. This clarifies that the joining zone can also be curved, preferably in the shape of a partial circle, and closed in itself, e.g. as a full circle. A patch is always an exchange component of defined shape as well as local overmeasure, for repairing blade damage of sizeable volumetric extent.

By contrast, there are forms of damage where the blade material is predominantly worn in the surface area, e.g. by mechanical touching of stator components, by erosive particles in the gas flow or by the corrosive hot gasses themselves. In this case it may be more favorable, following removing "smoothing" of the damaged component surface, to apply missing material in a "shapeless" way, in particular in a molten condition by welding or soldering. In this context, laser powder build-up welding is a promising production method involving relatively little heat exposure for the component.

FIG. 5 shows repair by material deposit using the example of a blade 10 with a tip 13 to be renewed. The material build-up 19 is shown which comprises overmeasure both laterally and at the top. The representation shows a partial cross section of the blade at an aspect parallel to the rotor axis. Strictly speaking, the hatched joining zone 17 at the upper end of the shortened blade 10 would have to extend to the entire cross section of the material build-up 19 because said build-up has been applied all over by welding. However, so as to be able to distinguish other details within the material build-up 19, hatching is shown in part only. Below the joining zone 17, the actual surface I 6 is acquired in the measuring zone M 6 around the blade profile and processed by data processing means. A matched surface O 6 is produced which merges into the desired surface 6 or is matched to the latter as well as is possible (here again: "desired profile takes precedence over desired position"). A particularly simple option for producing a matched surface would comprise of a tangentially straight extension of the actual surface, in this case I 6, at each position around the profile, upward to the blade tip 13, i.e. from a mathematical point of view, in the upward direction to specify the minimum curvature "infinite" (8). This might be expedient where the radial height of the material build-up is very slight, i.e. where a transition to the direction of the desired surface or the desired profile is not possible in practice. The degree of deviation between the actual surface near the joining zone and the desired surface is a further factor to be considered.

FIG. 5 shows an additional desired surface S 7, indicated by a dashed line with shorter dashes, which in relation to S 6 leads to an additional defined material removal (shorter dashes). This is intended as a pointer for blades with a step-shaped profile-change towards their tips, through which the "drop-shaped profile" merges into a very thin profile of largely constant thickness along its length, and into a curvature corresponding to the suction side of the blade.

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

What is claimed:

1. A method for producing matched fluidic surfaces on rotor units with integral blades, preferably in axial design comprising a hub and at least one blade ring, by removing by machine after integral joining of at least one blade and the hub and/or at least one part of a blade and at least one blade, whereby prior to removal, at least one of these parts overall or locally comprises overmeasure in the area of the joining zone, in particular in the context of producing new parts and of repairing so-called blisks (bladed disks) and blings (bladed rugs) for gas turbines, whereby at least one actual surface describing the local shape of the component is acquired by a measuring method, and a fluidic surface is produced which is matched to the actual surface and which from the point of view of fluid technology and strength also favorably shapes the joining zone, characterized by combining the following characteristics:
   A) measuring acquisition of the actual surface (I 1 to I 6) and production of the matched surface (O 1, O 3 to O 6), of which there is at least one, take place on one processing machine with the same clamping of the rotor unit (1, 2, 3), i.e. in a connected measuring, calculating and processing cycle;
   B) the desired surface (S 3 to S 7) circumscribing in radial direction the desired profiles in the desired position, of each area to be processed from the blade tip (12, 13) to the hub (4, 5, 6) is made available to the processing machine in the form of stored data;
   C) based on at least one actual surface (I 1 to I 6) acquired by a measuring method, said actual surface which usually comprises geometric tolerances, extending close to the joining zone (14 to 17) a surface (O 1, O 3 to O 6) extending beyond the joining zone (14 to 17) is calculated according to the following criteria and produced by material removal:
      a) at each point the fluidic surface (O 1, O 3 to O 6) tangentially adjoins (as far as possible mathematically continuously), i.e. without kinks or steps, in straight and/or curved line with a locally variably specifiable minimum curvature, at least one actual surface (I 1 to I 6) and/or one at first theoretical, repair surface (R), with the latter being defined and produced at a locally variably specifiable minimum distance to a measured actual surface (I 4) within the component;
      b) the fluidic surface (O 1, O 3 to O 6) as far as possible corresponds to a mathematically continuous, spatial, at least largely curved surface, at each position comprising a locally and/or direction-dependent variably-specifiable minimum curvature;
      c) in every area where the fluidic surface (O 1, O 3 to O 6) to be produced, due to a) and/or b) and/or local component dimensions cannot correspond, or can only partly correspond, to the desired surface (S 3 to S 7) which in radial direction circumscribes the desired profiles in the desired position, the surface (O 1, O 3 to O 6) in each radial height is approximated as well as possible to the local desired profile stored by data technology, taking into account mathematical continuity.

2. A method according to claim 1 for use in the context of producing new parts using blades whose fluidic shape was largely finished prior to joining to the hub, characterized in that for each blade (7) a finished actual surface (I 3) is acquired by measuring method (M 3) radially outside and close to the joining zone (14), and that radially inward from the measured actual surface (I 3) a matched fluidic surface (O 3) which merges into the desired surface (S 3), is produced.

3. A method according to claim 1 for use in the context of producing new parts or in the context of repair involving blade exchange using blades whose fluidic shape was largely finished prior to joining to the hub, characterized in that in each instance a finished actual surface (I 1) radially outside and close to the joining zone (14), as well as an actual surface (I 2) between the joining zone (14) and the hub (4), are acquired by measuring method (M 1, M 2), and that between these actual surfaces (I 1, I 2) a matched fluidic surface (O 1) is produced.

4. A method according to claim 1 for use in the context of repair with blade exchange using at least one component whose shape comprises overmeasure on all sides when compared to the fluidic desired shape, characterized in that in each case an actual surface (I 4) between the joining zone (15) and the hub (5) is acquired by measuring method (M 4); that a repair surface (R) on all sides positioned at a distance to the actual surface (I 4) within the component is defined; that from the repair surface (R) radially outward at as low a height as possible, a surface (O 4) which merges into the desired surface (S 4) is produced; that by material removal on all sides, the fluidic shape of the blade (8) is as far as possible produced as a desired surface (S 4) and; that the repair surface (R) towards the hub (5) is produced by removing material.

5. A method according to claim 1 for use in the context of repair involving exchange of part of a blade (patching) in the area of the inlet edge and/or the outlet edge using at least one patch whose shape comprises overmeasure on all sides when compared to the fluidic desired shape, characterized in that on the suction side and on the pressure side of a patched blade (9) the actual surface (I 5) is acquired by measuring method (M 5) close to the joining zone(s) (16) and that at every radial height of the blade (9) affected by the repair, the actual profile (I 5) is completed by material removal on all sides, of every exchanged component (18), by the best possible approximation to the desired profile (S 5) stored by data technology.

6. A method according to claim 1 for use in the context of repair involving buildup of material in the area of the entire blade tip by producing an area whose shape comprises overmeasure when compared to the fluidic desired shape, characterized in that radially within and close to the joining zone (17) of a blade concerned, the actual surface (I 6) around the blade (10) is acquired by measuring method (M 6), and that the surface (O 6) of the blade (10) is completed by removing the overmeasure, starting from the actual surface (I 6) to the radial desired height at the built-up blade tip (13).

7. A method according to claim 1, characterized in that removal of the component material takes place mechanically/by cutting, e.g. by grinding or milling, in particular high-speed milling, or electrically or electrochemically/without cutting, e.g. using electrical discharge machining (EDM) or electrochemical machining (ECM) techniques.

8. A method according to claim 1, characterized in that the acquisition of the surface by measuring method takes place with component contact, e.g. using tactile sensors, or without contact, e.g. using optical sensors.

9. A method for producing matched fluidic surfaces on rotor units having integral blades applying material to a blade and the hub where the blade is to be connected to the hub or is in need of repair, axially connected to a hub, the method comprising the following steps:

removing some of the material by machine after integral joining of the blade and the hub, whereby prior to removal, at least one of these parts or the application of material overall or locally comprises an overmeasure where the blade is connected to the hub whereby at least one actual surface describing a local shape of the component is acquired by a measuring method, and a fluidic surface is produced which is matched to the actual surface, wherein the overmeasure and measuring method comprises measuring an actual surface of the blade, an actual surface of the hub to be connected to the blade and production of a matched surface by a processing machine;

a desired surface circumscribing in radial direction desired profiles in a desired position, of each area to be processed is made available to the processing machine in the form of stored data;

based on at least one actual surface acquired by the measuring method, said actual surface extending close to the joining zone and a surface extending beyond the joining zone are calculated according to the following criteria and produced by material removal:

a) at each point the fluidic surface tangentially adjoins without kinks or steps, with a locally variably specifiable minimum curvature, at least one actual surface or repair surface, with the latter being defined and produced at a locally variably specifiable minimum distance to a measured actual surface within the component;

b) the fluidic surface corresponding to a mathematically continuous, spatial, at least largely curved surface, at each position comprising a locally and/or direction-dependent variably-specifiable minimum curvature;

c) in every area where the fluidic surface to be produced, due to a) and/or b) and/or local component dimensions cannot correspond, or can only partly correspond, to the desired surface which in radial direction circumscribes the desired profiles in the desired position, the surface in each radial height is approximated as well as is possible to the local desired profile stored by data technology, taking into account mathematical continuity.

10. A method according to claim 9 wherein for each blade a finished actual surface is acquired by measuring method radially outside and close to the joining zone, and that radially inward from the measured actual surface a matched fluidic surface is produced which merges into the desired surface.

11. A method according to claim 9 wherein in each instance a finished actual surface radially outside and close to the joining zone, as well as an actual surface between the joining zone, and the hub, are acquired by the measuring method, and that between these actual surfaces a matched fluidic surface is produced.

12. A method according to claim 9 wherein in each case an actual surface between the joining zone and the hub is acquired by measuring method; that a repair surface on all sides positioned at a distance to the actual surface within the component is defined; that from the repair surface radially outward at as low a height as possible, a surface which merges into the desired surface is produced; that by material removal on all sides, the fluidic shape of the blade is as far as possible produced as a desired surface and; that the repair surface towards the hub is produced by removing material.

13. A method according to claim 9 on a suction side and on a pressure side of a patched blade the actual surface is acquired by measuring method close to the joining zone and that at every radial height of the blade affected by the repair, the actual profile is completed by material removal on all sides, of every exchanged component, by the best possible approximation to the desired profile stored by data technology.

14. A method according to claim 9 wherein radially within and close to the joining zone of a blade concerned, the actual surface around the blade is acquired by measuring method, and that the surface of the blade is completed by removing the overmeasure, starting from the actual surface to the radial desired height at the built-up blade tip.

15. A method according to claim 9 wherein removal of the component material takes place mechanically/by cutting, e.g. by grinding or milling, in particular high-speed milling, or electrically or electrochemically/without cutting, e.g. using electrical discharge machining (EDM) or electrochemical machining (ECM) techniques.

16. A method according to claim 9 wherein the acquisition of the surface by measuring method takes place with component contact, e.g. using tactile sensors, or without contact, e.g. using optical sensors.

* * * * *